United States Patent [19]
Tershay

[11] Patent Number: 5,810,531
[45] Date of Patent: Sep. 22, 1998

[54] SKATEBOARD FASTENING DEVICE

[76] Inventor: Nicholas A. Tershay, 212 Wanzer St., Santa Cruz, Calif. 95060

[21] Appl. No.: 986,120

[22] Filed: Dec. 5, 1997

[51] Int. Cl.$^6$ ........................................................ F16B 37/14
[52] U.S. Cl. ............................................. 411/429; 411/410
[58] Field of Search .................................... 411/429, 371, 411/910, 403, 410, 402; 280/11.28, 87.042

[56] References Cited

U.S. PATENT DOCUMENTS

| | | | |
|---|---|---|---|
| 1,867,229 | 7/1932 | Nelson | 411/429 |
| 2,353,531 | 7/1944 | Whitney | 411/410 |
| 3,448,466 | 6/1969 | Haldopoulos | 411/429 |
| 4,480,513 | 11/1984 | McCauley | 411/429 |

*Primary Examiner*—Flemming Saether
*Attorney, Agent, or Firm*—Jeffrey A. Hall

[57] ABSTRACT

A fastening device for fastening skateboard trucks to a skateboard, or other articles and components to one another includes a threaded hexagonal body element having a planar upper surface and a planar lower surface. The threaded hexagonal body element body element includes a threaded receiving aperture for receiving a bolt or screw. An enlarged hemispherical head with a circular surface is mounted on or formed integrally with the threaded hexagonal body element on the planar upper surface. The enlarged hemispherical head has a hexagonal aperture in a central polar region thereof being adapted to receive and secure a hexagonally configured tool therein.

12 Claims, 1 Drawing Sheet

U.S. Patent  Sep. 22, 1998  5,810,531
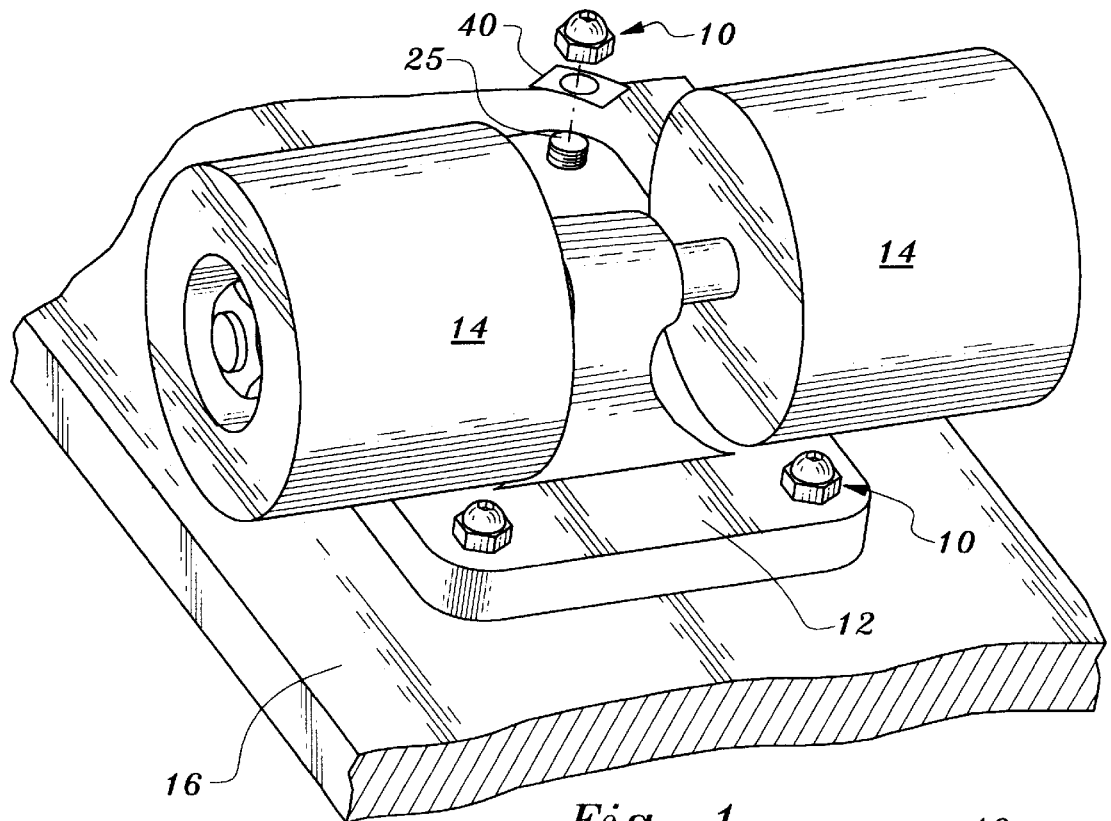
Fig. 1
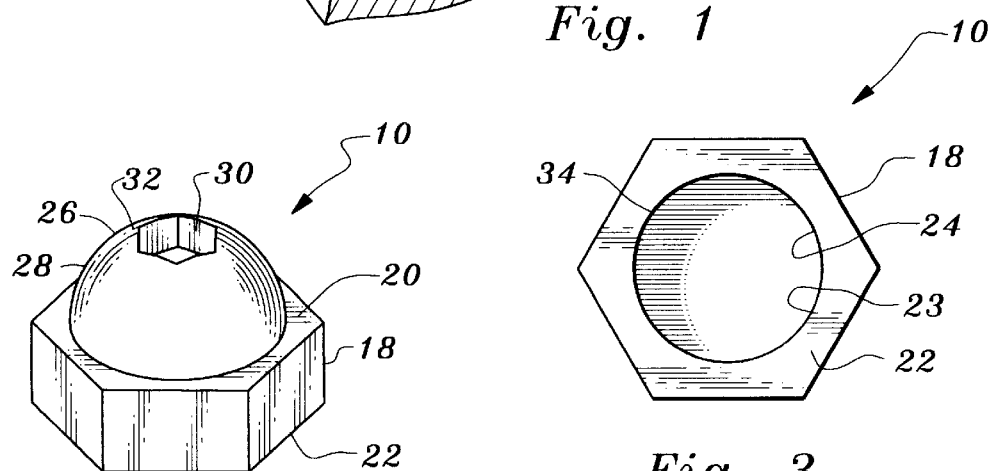
Fig. 2
Fig. 3
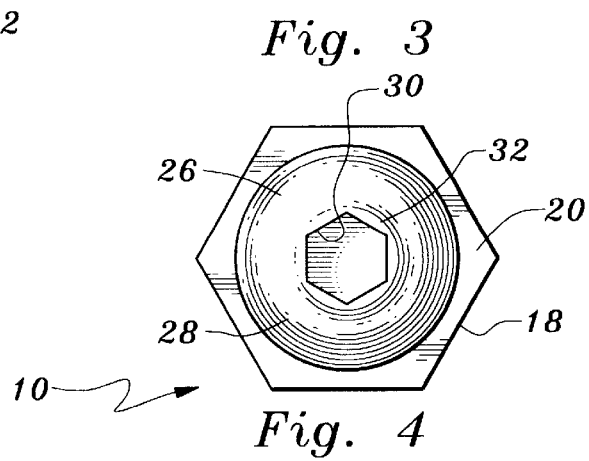
Fig. 4

SKATEBOARD FASTENING DEVICE

BACKGROUND OF THE INVENTION

1. Field of Invention

This invention relates to improvements in fasteners, and particularly to nuts which can be tightened with an alien key onto any compatible bolt or screw without the use of pliers or wrenches, for use on skateboards, bicycles, furniture, machinery and the like.

2. Description of the Related Art

Various fastening devices have been proposed and implemented for fastening and clamping various articles and materials. Nuts and bolts for securing various articles have been proposed in a wide variety of configurations, sizes, and for various applications. Such fasteners are useful for a wide variety of applications but are limited in particular applications such as securing skateboard trucks to a skateboard. Such limitations arise from the need to use a pliers or wrench to loosen the bolts or screws which secure the skateboard truck to the skateboard which can be very difficult and cumbersome to loosen and remove.

A variety of fastening device have been proposed to avoid this problem, such as U.S. Pat. No. 3,283,638 issued to Ansingh where an allen head screw is disclosed, or in U.S. Design Pat. No. 126,409 issued to Trott where an socket head cap screw is shown with an allen key hole configuration. Other examples of this genre are seen in U.S. Pat. No. 363,878 issued to Hayabusa showing a bolt, nut, and washer assembly, U.S. Pat. No. 2,041,809 issued to Bernhard for a locking device with an allen head, U.S. Pat. No. 2,302,621 issued to Luboshez, U.S. Pat. No. 4,242,932 issued to Barmore, U. S. Pat. No. 2,931,265 issued to De Lacy, and U.S. Pat. No. 3,390,906 issued to Wing.

The present invention provides a nut which may be used in a wide variety of applications for fastening articles, however, it being particularly suited for fastening skateboard trucks to skateboards. The faster of the present invention is a nut having an hemispherical head on a threaded hexagonal base member with an hexagonal aperture positioned in a central polar position on the hemispherical head, providing both convenience of attachment and removal. That is, the nut may be tightened to a bolt or screw without the need to use pliers or wrenches.

Accordingly, it is the primary object of this invention to provide a nut which may easily and conveniently be used for fastening articles such as skateboard trucks, bicycle parts, furniture articles, and the like, which includes means to slidely receive an allen wrench in a receiving aperture therein, allowing for both easy and convenient removal of parts without using heavy and bulky hand tools.

Additional objects and advantages of the invention will be set forth in the description which follows, and in part will be obvious from the description, or may be learned by practice of the invention. The objects and advantages of the invention may be realized and obtained by means of the instrumentality's and combinations particularly pointed out in the appended claims.

SUMMARY OF THE INVENTION

To achieve the foregoing objects, and in accordance with the purpose of the invention as embodied and broadly described herein, a fastening nut for fastening skateboard trucks to a skateboard, or other articles and components to one another, includes a threaded hexagonal body element having a planar upper surface and a planar lower surface. The threaded hexagonal body element body element includes a threaded receiving aperture for receiving a bolt or screw. An enlarged hemispherical head with a circular surface is mounted on or formed integrally with the threaded hexagonal body element on the planar upper surface. The enlarged hemispherical head has a hexagonal aperture in a central polar region thereof being adapted to receive and secure a hexagonally configured tool therein.

The fastening nut is preferably composed of a durable resilient material such as metal, plastic, composite, or the like. The nut may be provided in a wide variety of shapes and sizes to accommodate different uses and application. accordingly, the nut may be tightened with an allen key on to any compatible bolt or screw without the use of pliers or a wrench. The fastening nut of the present invention makes the assembling and disassembling of skateboards convenient without the use of heavy and bulky hand tools. In other uses, the fastening nut of the present invention may be used for bicycles, furniture, machinery, and other articles or components where capped nuts are used.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 1 is a perspective view of a fastening nut securing a skateboard truck assembly to a skateboard, according to the invention.

FIG. 2 is a side view of such fastening nut, according to the invention.

FIG. 3 is a bottom view showing the threaded receiving aperture of such fastening nut, according to the invention.

FIG. 4 is a top view showing the enlarged hemispherical head portion of such fastening nut, according to the invention.

DESCRIPTION OF THE PREFERRED EMBODIMENTS

Reference will now be made in detail to the present preferred embodiments of the invention as illustrated in the accompanying drawings.

In accordance with the present invention, there is provided a fastening device for fastening skateboard trucks to a skateboard, or other articles and components to one another includes a threaded hexagonal body element having a planar upper surface and a planar lower surface. The threaded hexagonal body element body element includes a threaded receiving aperture for receiving a bolt or screw. An enlarged hemispherical head with a circular surface is mounted on or formed integrally with the threaded hexagonal body element on the planar upper surface. The enlarged hemispherical head has a hexagonal aperture in a central polar region thereof being adapted to receive and secure a hexagonally configured tool therein.

In accordance with the present invention, there is also provided an improved fastening nut for fastening bolts and screws to an article having a threaded hexagonal body element including a planar upper surface and a planar lower surface. The threaded hexagonal body element body element preferably has a threaded receiving aperture in a bottom portion thereof and a substantially hemispherical dome head having a convex circular surface being mounted on the threaded hexagonal body element on the planar upper surface. The hemispherical dome head has a hexagonal aperture in a central upper region and is adapted to receive and secure a hexagonally configured tool therein.

In FIG. 1, fastening nut 10 is shown fastening a skateboard truck assembly 12 with wheels 14 to a skateboard 16 according to a preferred embodiment of the invention. Fastening nut 10 is preferably configured with a threaded hexagonal body element 18 having a planar upper surface 20 and a planar lower surface 22. The threaded hexagonal body element 18 has a threaded receiving aperture 24 for receiving a bolt or screw 25 therein, shown with washer 40 in FIG. 1.

With reference to FIGS. 2 and 4, fastening nut 10 is preferably configured with an enlarged hemispherical head 26 having a circular surface 28. Hemispherical head 26 is formed integrally with or mounted on threaded hexagonal body element 18 on upper planar surface 20 of the threaded hexagonal body element. A hexagonal aperture 30 is preferably positioned in a central upper or polar region 32 of hemispherical head 26 and is adapted to receive and secure a hexagonally configured tool therein. Hexagonal aperture 30 is preferably positioned in line with a central axis of the threaded receiving aperture 24 of hexagonal body element 18.

In FIG. 3, threaded receiving aperture 24 is seen with threads 23 for receiving and securing a bolt or screw. The threaded receiving aperture 24 is roofed by a roof portion 23 formed by hemispherical head 26 or the inner side of planar upper surface 20 of hexagonal body element 18. Preferably, both hexagonal body element 18 and hemispherical head 26 are composed of metal, however, they may be made of other durable resilient materials such as composites, thermoplastic, or the like.

In operation and use fastening nut 10 is very efficient and cost effective for fastening skateboard trucks to a skateboard, or for fastening other articles and components to one another. When using fastening nut 10 to fasten an article such as a component such 12 skateboard truck to skateboard 16, the skateboard truck 12 is held in position by bolt or screw 25 and fastening nut 10 is secured to bolt or screw 25 by threaded portion 24. Fastening nut 10 is then tightened on to bolt or screw 25 with an Allen wrench using hexagonal aperture 30. In this way, a skateboard truck may be conveniently fastened or removed from a skateboard, or other articles or components fastened to another article, component, object, or fixture.

As is evident from the above description, a wide variety of clamps may be fashioned from the present invention. For example, various arm lengths, jaw types, shapes, and the use of different materials to make body 12 and jaws 26 and 34, corresponding to variations in application are within the scope of the present invention. Additionally, the novel front attachment of spring 40 and moveable jaw 34 allow for easy of operation and application, and provide a very strong and durable clamping means.

Additional advantages and modification will readily occur to those skilled in the art. The invention in its broader aspects is, therefore, not limited to the specific details, representative apparatus and illustrative examples shown and described. Accordingly, departures from such details may be made without departing from the spirit or scope of the applicant's general inventive concept.

What is claimed is:

1. A fastening device for fastening skateboard trucks to a skateboard, comprising:

a threaded hexagonal body element including a planar upper surface and a planar lower surface; said threaded hexagonal body element body element including a threaded receiving aperture therein; and an enlarged hemispherical head having a circular surface being mounted on said threaded hexagonal body element on said planar upper surface; said enlarged hemispherical head having a hexagonal aperture in a central polar region thereof being adapted to receive and secure a hexagonally configured tool therein.

2. The fastener of claim 1, wherein said enlarged hemispherical head is centrally positioned on said planar upper surface of said threaded hexagonal body element.

3. The fastener of claim 1, wherein said a hexagonal aperture in said enlarged hemispherical head is positioned in line with an axis of said threaded receiving aperture of said threaded hexagonal body element.

4. The fastener of claim 1, wherein said enlarged hemispherical head forms a roof portion of said threaded receiving aperture of said threaded hexagonal body element.

5. The fastener of claim 1, wherein said threaded hexagonal body element is composed of metal.

6. The fastener of claim 1, wherein said enlarged hemispherical head is composed of metal.

7. A fastening nut for fastening bolts and screws to an article, comprising:

a threaded hexagonal body element including a planar upper surface and a planar lower surface; said threaded hexagonal body element body element including a threaded receiving aperture in a bottom portion thereof; and a hemispherical dome head having a convex circular surface being mounted on said threaded hexagonal body element on said planar upper surface; said hemispherical dome head having a hexagonal aperture in a central upper region thereof being adapted to receive and secure a hexagonally configured tool therein.

8. The fastener of claim 7, wherein said hemispherical dome head is centrally positioned on said planar upper surface of said threaded hexagonal body element.

9. The fastener of claim 7, wherein said a hexagonal aperture in said hemispherical dome head is positioned in line with an axis of said threaded receiving aperture of said threaded hexagonal body element.

10. The fastener of claim 7, wherein said enlarged hemispherical head forms a roof portion of said threaded receiving aperture of said threaded hexagonal body element.

11. The fastener of claim 7, wherein said threaded hexagonal body element is composed of metal.

12. The fastener of claim 7, wherein said hemispherical dome head is composed of metal.

* * * * *